Jan. 20, 1959
R. S. SMITH
2,869,215
MOLDING METHOD
Filed June 20, 1955
2 Sheets-Sheet 1
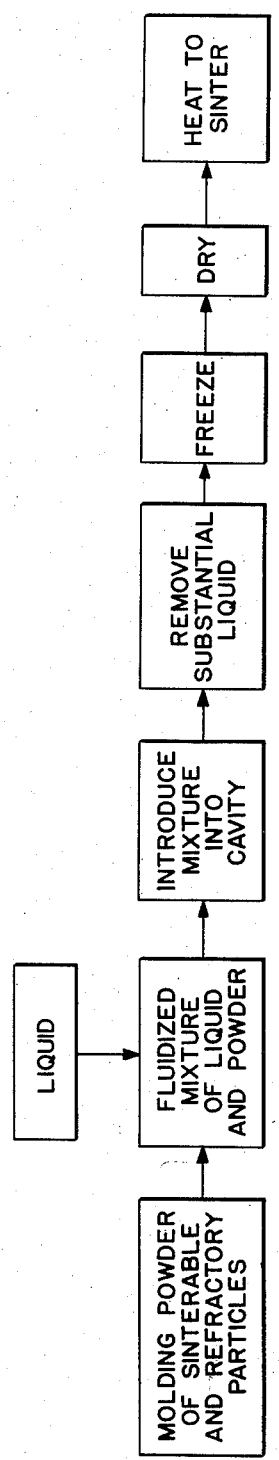
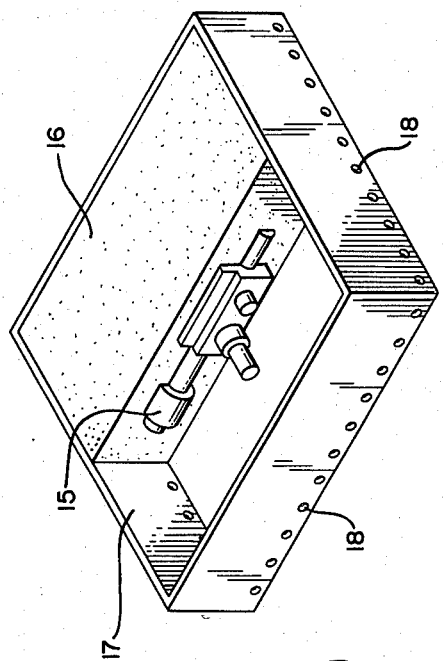
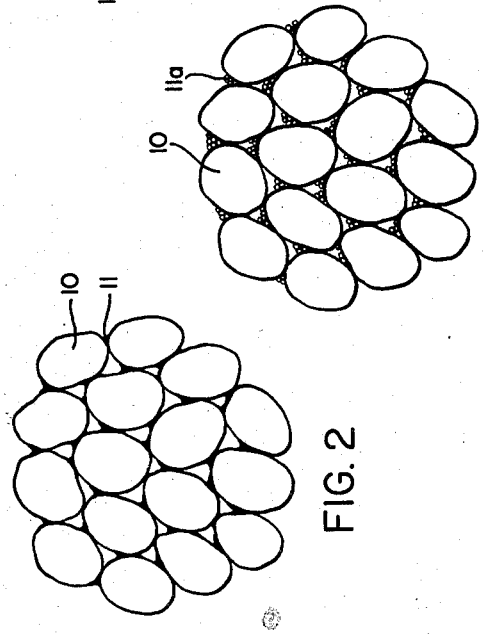
INVENTOR.
ROBERT S. SMITH
BY
ATTORNEY Jan. 20, 1959 R. S. SMITH 2,869,215
MOLDING METHOD
Filed June 20, 1955 2 Sheets-Sheet 2

INVENTOR.
ROBERT S. SMITH
BY
ATTORNEY

United States Patent Office 2,869,215
Patented Jan. 20, 1959

2,869,215

MOLDING METHOD

Robert S. Smith, Merchantville, N. J.

Application June 20, 1955, Serial No. 516,475

2 Claims. (Cl. 25—156)

The subject invention relates generally to improvements in the art of molding and is particularly directed to novel molding methods, compositions for use therein, and articles produced thereby. This invention embodies improvements over the invention disclosed in my co-pending patent application Ser. No. 344,333, filed March 24, 1953, now abandoned; and, the instant application is a continuation-in-part of my above identified, prior application.

In said prior patent application, there is disclosed the method of molding wherein a molding material, say ceramic, is fluidized, as by mixing therewith a quantity of liquid, and the mixture is formed or shaped, congealed, and dried. The dried molding material may then be fired or vitrified. The congealing step rigidifies or hardens the formed article, enabling the latter to be conveniently and safely handled before firing, even when the article is of an intricate and delicate shape. Also disclosed in said prior patent application was the use of a flexible mold having a cavity adapted to form re-entrant surfaces on an article molded in the cavity, and wherein freezing of the molded article permitted the latter to be withdrawn from the mold cavity without damage to the re-entrant surfaces.

The invention of the instant application incorporates the advantageous features mentioned in the foregoing paragraph, and provides additional advantages in connection with the molding of powdered metals, metalloids and non-metallics. As is well known, only small and relatively simple parts can be produced by conventional processes of powder metallurgy, since extremely high pressures are required to press a compact suitable for sintering. In addition, it is often necessary to employ a binding agent in the compact, such as a relatively viscous material, in order that the compact may be safely handled between the pressing and sintering operations. The viscous binder cannot ordinarily be removed from the finished part; and, as the binder is objectionable in many applications, the use of powder metallurgical processes for many parts is accordingly limited.

Porous products of powder metallurgy have been fabricated by incorporating a volatile wetting agent with the powder and viscous binding agent, and removing the wetting agent subsequent to the pressing operation to leave pores in the finished article. In the fabrication of porous, as well as non-porous articles by powder metallurgical processes, there is considerable shrinkage during the sintering operation, which must, if possible, be anticipated in preparing the dies. However, this is extremely difficult in many instances, due to warpage or uneven shrinkage during the sintering.

A closely related difficulty inherent in prior metallurgy products is the inability to carburize or case harden the parts without considerable shrinkage or warping.

It is therefore one object of the present invention to provide a method of molding powdered material which overcomes the above mentioned disadvantages of the prior art, which requires little or no pressure, is capable of producing relatively large, delicate and intricate parts, and eliminates the need for a viscous binding agent or the like. Further, by the method of the instant invention shrinkage and warping is reduced to a negligible degree, so that dies, patterns and like may be made to actual size without anticipation or compensation for dimensional changes. The extremely high degree of dimensional stability resulting from the instant invention also permits articles to be carburized or case hardened without shrinkage or warping, and substantially eliminates the need for machining of parts.

In the use of permanent molds for casting metals, numerous difficulties have been encountered. For example, heat conductivity of the permanent metal mold is usually a critical factor. In casting small sections, a permanent metal mold of too great a heat conductivity will chill the cast metal and solidify the latter before it can fill the section, while large sections may require excessive time for cooling. An additional drawback in the use of permanent metal molds is that of insufficient porosity to permit the escape of gases, which consequently form defects in the finished casting. This lack of porosity also prevented the use of sand cores from which gases were expelled during the casting procedure. Moreover, prior permanent molds were relatively costly, as they involved considerable precision machining.

Another object of the present invention therefore resides in the provision of a permanent mold which overcomes the disadvantages set forth in the foregoing paragraph, is relatively inexpensive to produce, and can be fabricated to any desired degree of porosity and thermal conductivity. More specifically, the permanent mold of the present invention may be cast directly to the exact, required dimensions, within very close tolerances, without allowance for shrinkage or warping, and thus eliminate machining operations. Moreover, the composition of the permanent mold may be predetermined before casting to afford the desired porosity and conductivity characteristics.

Other objects of the present invention will become apparent upon reading the following specification and referring to the accompanying drawings, which form a material part of this disclosure.

The invention accordingly consists in the features of construction, and combinations and arrangements of elements and method steps, which will be exemplified in the following description, and of which the scope will be indicated by the appended claims.

In the drawings:

Figure 1 is a schematic representation of steps involved in the method of the present invention;

Fig. 2 is a greatly enlarged, fragmentary view showing the microstructure of the article of the present invention;

Fig. 3 is a greatly enlarged fragmentary view showing a molding powder adapted for use in practicing the method of the present invention;

Fig. 4 is a top perspective view illustrating an intermediate stage in practicing the method of the present invention;

Figure 5:
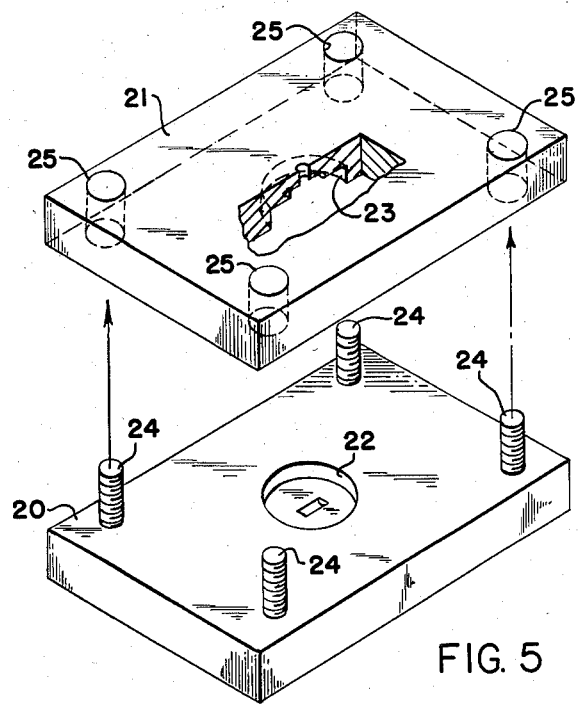
Figure 5 is a perspective exploded view showing a pair of mold parts of the present invention in an intermediate stage in their method of formation.

Referring now more particularly to the drawings, and specifically to the schematic flow diagram of Fig. 1, it is seen that a powdered molding material is provided which includes particles capable of sintering at a predetermined temperature, and particles which are refractory at said temperature. For many purposes, as will appear presently, the molding powder need not include refractory particles.

A liquid, such as water, alcohol, or other preferably volatile wetting agent, is added to or mixed with the molding powder for fluidizing the latter to the desired degree. That is, the fluidized mixture of liquid and molding powder should contain a greater percentage of liquid if it is required to pour the mixture, while a lesser percentage of liquid will suffice if it is intended only to pack the mixture under pressure.

The fluidized mixture is then packed, poured, or otherwise introduced into a cavity having an internal configuration such as to form the mixture in the desired shape. A portion of the wetting agent or liquid component may now be removed from the shaped mixture, as by draining, evaporating, decanting or otherwise, leaving sufficient liquid remaining in the mixture to rigidly set or freeze the latter upon the removal of heat therefrom.

The powdered molding material and liquid remaining mixed therewith are then frozen in the desired shape. That is, the remaining liquid congeals to rigidly set the molding powder in a solid body of the desired shape and permit convenient handling of the rigidified body without damage thereto.

The frozen rigid body is then dried, preferably relatively slowly, so as to remove substantially all the liquid or wetting agent. The dried molding material retains the desired shape and may be sintered to rigidify in this shape. Under certain conditions, where accuracy of dimensions is not very critical, the frozen body may be dried rapidly in conjunction with the sintering process. Also when the final dimensions are not critical, the removal of liquid in excess of that necessary to set the powder upon freezing, may be eliminated. However, the presence of just sufficient liquid for proper freezing, and subsequent slow drying, minimizes shrinkage and produces articles of unusual accuracy.

As a specific example of the method of the instant invention, there follows a detailed description of an improved, permanent mold part made according to the method. The permanent mold or mold part may of course take any desired shape, so that a drawing of the mold configuration is unnecessary. However, Fig. 2 illustrates the microstructure of the material of the finished mold. In particular, the material of the finished mold is composed of relatively large particles 10 having crevices or interstices therebetween, and relatively small particles 11 disposed in the interstices between and sintered to the large particles for rigidly cementing the latter together. The large particles 10 thus form a skeletal, relatively incompressible structure, analagous to a pile of stones, while the relatively small particles cement the large particles together.

In the permanent mold of the present invention, it is preferred that the relatively small, sintered particles 11 do not fill the interstices between the relatively large particles 10, so that the mold will be porous and readily allow gases to escape from the mold cavity. The degree of porosity of the mold, and its heat conductivity, may be controlled by varying the relative proportions of the large and small particles. In some applications of the method of the instant invention, the relatively small particles may be present in such quantities as to completely fill the interstices between the relatively large particles, or the latter may be eliminated entirely, to substantially reduce or eliminate porosity of the material.

In practicing the method of the instant invention, a molding powder, as illustrated in Fig. 3, may be advantageously employed. The molding powder includes as one component relatively small, sinterable particles 11a, and as another component relatively large particles 10, which are refractory at the sintering temperature of the small particles. The small particles 11a are preferably about five microns in size, but may be of any size up to about minus 325 mesh, while the large particles 10 are preferably between about 50 and 100 mesh in size, but may be between about 25 and about 200 mesh in size. It is essential that the relatively small particles 11a sinter at a temperature below the sintering temperature of the relatively large particles; or stated otherwise, that the relatively large particles are refractory, so as not to recrystallize or deform at the sintering temperature of the relatively small particles.

In making permanent molds, chromium or ferrochrome has advantageously been employed as the large particles, and carbonyl iron or carbonyl nickel as the small particles. Although carbonyl iron and carbonyl nickel have high melting points, they will sinter as low as 500° C. in small particle size, while the chromium or ferrochrome will be refractory at this temperature in large particle size. Further, the small particles will sinter at this relatively low temperature without being under pressure.

In addition to those materials mentioned above, numerous other materials in fine powdered form will sinter at relatively low temperatures and may be satisfactorily employed as the small particles of the molding powder, among which are oxides, such as $MgO$, $Al_2O_3$, $ZnO$, $Fe_2O_3$; glasses, such as borates, and silicates; and metals, such as copper, cobalt, iron, nickel and chromium.

In particular it has been found that the use of chromic oxide is especially advantageous. In the casting of ferrous materials in molds which include a chromic oxide component, the mold material does not react with the cast material, as for example in the case of molds including carbon. Further, any of the above mentioned metals may also serve as the large particles of the molding powder, having sufficiently refractory characteristics in the form of large particles, within the limits mentioned hereinbefore.

The relative proportions of the small and large particles in the molding powder may vary considerably according to the characteristics desired. For example, a relatively impervious mold may be formed from a powder having little or no large particle content, while a highly porous mold may be formed from a powder having just sufficient small particle content to cement the large particles together. Further, the relative proportions of small and large particles, and the particular materials selected therefor, determine and permit control of the conductivity of the mold. Dimensional accuracy of the mold also depends on the particular components and their proportions in the molding powder.

By way of example, molding powders having about 70% by weight of large particles and 30% by weight of small particles have been found highly suitable for making molds, while powders having between about 95% to about 35% by weight of large particles and about 5% to about 65% by weight of small particles have also been found satisfactory.

If it is necessary or desirable to pour the molding powder into a cavity, sufficient liquid is mixed with the molding powder to fluidize the latter. When the molding powder and liquid mixture is to be introduced into a fairly complex cavity, the liquid may advantageously constitute about 10% by weight of the mixture. The mixture is preferably of cream-like consistency adapted to enter all parts of the mold cavity, completely filling the latter, and conformably engaging with the cavity surface without trapping air or other gas. That is, a liquid and molding powder mixture having about 10% liquid by weight will permit the passage therethrough of gas bubbles and accurately conform to the interior surface of a cavity. When the cavity into which the liquid and molding powder mixture is to be introduced is of very simple shape, less liquid may be required, say as little as about 2% by weight, or other amount sufficient to rigidify the formed body of molding material and liquid. Conversely, greater than 10% by weight of liquid may advantageously be employed in the liquid and molding powder mixture when the latter is introduced into a relatively intricate cavity.

In Fig. 4 is shown an intermediate stage in making a permanent mold according to the present invention. A pattern of the article to be cast in the permanent hold is partially visible at 15. After the pattern is studied for parting lines, etc., a plaster of Paris, or other temporary mold is made from the pattern in the conventional manner. One part of the temporary mold is shown at 16, with the pattern 15 partially received within the mold part. In this condition, the pattern and mold part 16 are disposed within an open top box or container 17, preferably having drainage holes in its lower region. The interior of the container 17, with the mold part 16 and pattern 15 disposed within the container, define a cavity for receiving the above described liquid and molding material mixture.

A suitable parting agent is preferably applied to the surfaces of the pattern 15 and temporary mold part 16 disposed within the cavity. Flaky aluminum pigment has been found highly advantageous for this purpose; and, aluminum foil is useful for some large wooden patterns.

After the liquid and molding material mixture is introduced into the cavity thus defined, as by pouring or packing, any excess of liquid beyond that necessary in the freezing operation is preferably removed. More specifically, liquid in excess of about 2 to 4% by weight of the liquid and molding material mixture is withdrawn.

This excess liquid may be removed by draining or colandering, as through the holes 18, heating to evaporate the liquid, or drawing liquid off from the top of the container, as by an aspirator. In the latter procedure, jarring or vibrating the container 17, permitting the powder to settle, and drawing off or decanting water from the top, has been found highly effective, especially when the operation is repeated several times. The liquid from which the powder has settled out may also be removed by heating.

It will be noted that the parting surface of the temporary mold 16 is preferably disposed vertically, so that the possibility of trapping air bubbles at such surface is minimized.

The mixture of molding powder and remaining liquid is then frozen to congeal the remaining liquid and solidify the mixture in the shape of the cavity. The resultant frozen body may then be removed from the cavity and maintained in its frozen condition. Obviously, the rigidity of the frozen body obviates the possibility of damage or "shake-out" upon removal of the pattern.

The above described procedure is repeated for each part of the permanent mold, so that a plurality of frozen bodies are produced, one for each mold part. The frozen bodies are fitted together in their proper engaging relation corresponding to the complete mold. In this condition, the frozen bodies are permitted to thaw and dry. That is, the frozen bodies are permitted to thaw and dry with their parting surfaces in facing engagement with each other. This assures good intimate contact between the parts of the finished permanent mold, as will appear in greater detail hereinafter.

In addition to permitting casting parts to thaw with interfaces in contact, an additional procedure is to make castings with at least one recess on a portion of one parting surface into which an easily sinterable filling material (such as the small particle component) is poured. Thus, in the initial stage of the sintering process the castings are cemented to one another by the filling material over a small portion of the interface which further minimizes warpage, and these filled portions may be so placed that they can easily be cut after sintering.

Another method of minimizing warpage is to place a plate against an inner wall of the box or container 17 of Fig. 4. The plate contains screws or other fasteners which protrude inwards into the region of the box which receives the casting material. Thus, a casting is made with a plate screwed to one surface of it. The plate is made of such material that it will not warp during sintering, and thereby further minimizes warpage during sintering. A suitable parting agent, such as aluminum flakes, is used on the plate and screws so that the plate may be unscrewed after sintering and may be reused.

The drying procedure is preferably accomplished at room temperature over a period of between about six and about ten hours, and may include about one additional hour at 100° C. under inert, non-oxidizing conditions. This slow and gradual drying step has been found to produce dry bodies of relatively great strength. Hence, the dried bodies may be easily handled without damage, and the need for a viscous binder or the like is eliminated, which results in finished fired castings of much greater strength. That is, elimination of the binder conventionally employed in powder metallurgy, enables the resultant castings to be more thoroughly sintered and hence stronger.

The dried bodies, still in their complementary, contacting relation, may now be placed in a furnace, or the like, and there heated at a temperature sufficient to sinter the relatively small particles, without recrystallizing or deforming the relatively large particles, until the small particles are well sintered to the large particles. The dried bodies are preferably slowly raised to the firing temperature, say over ½ hour, and sintered for say three hours.

As the frozen bodies are dried and subsequently sintered with their parting surfaces in contact with each other, there is little or no relative warping of the parting surfaces. Further, the parting agent mentioned hereinbefore leaves the temporary mold and adheres to the frozen bodies so as to define an interface or layer preventing the finished mold parts from sticking together.

In addition to the excellent degree of intimate contact between the parting surfaces of the finished mold parts, the mold parts produced by the above described method have extremely good dimensional stability throughout the entire procedure. For example, with a molding powder of 70% large particle chromium (100 mesh) and 30% small particle Fe (5 microns), fired at a temperature of 1000° C., dimensional stability or shrinkage is maintained at .003 inch per inch, or less; and when sintered at 800° C., shrinkage is .002 inch per inch or less. This extremely high dimensional stability substantially completely eliminates the need for finish machining operations, and consequently effects substantial reduction in costs of molds.

High dimensional stability in the instant method is believed to result from the fact that there is little or no chemical reaction or change in the firing or sintering step, but only the surface action of the small particles sintering and adhering to the large particles. Further, as the large particles define a substantially incompressible skeletal structure, and undergo no chemical change or recrystallization, the dimensions of the skeletal structure remain constant, and any recrystallization or dimensional change in the sintering of the small particles is substantially wholly contained within the skeletal structure.

Molds made in accordance with the method described above are capable of producing castings having extremely thin sections without preheating the molds. That is, low conductivity molds of the present invention permit molten casting metal to completely fill the mold cavity without chilling.

This skeletal microstructure also enables the finished mold part, or other articles to be case hardened or carburized with negligible warping or shrinkage. The surface to be case hardened is coated with carbon paint, and the article fired in a hydrogen atmosphere at about 1000° C. for an hour, more or less depending upon the desired depth of hardness. For the same reasons as mentioned above, the skeletal microstructure enables strains in the hardened surface portion to be taken up or absorbed without warping.

Under conditions in which one of the components expands or contracts during the carburization reaction, it is possible to select and proportion the components so that dimension changes due to lattice parameter changes by one component are compensated by substantially equal and opposite lattice parameter changes by the other component, so as to produce high dimensional stability. In the case of a chromic oxide and chrome mixture, the former contracts and the latter expands, so that an approximate ratio of 1:1 by weight, plus or minus 10%, has been found to result in high dimensional stability.

As an additional advantage of the present invention, mold inserts of metal or otherwise may be cast integrally with an article being produced. For example, a metal rod or other part may be positioned in a mold cavity into which the fluidized molding composition is introduced. This permits the production of an article having different localized characteristics, such as different porosity, strength, etc., in different regions. Due to the need for high pressures in conventional powder metallurgy the use of inserts was usually very difficult if not impossible.

Another advantageous procedure of the present invention is that which permits the production, without machining, of complementary pieces having parting surfaces meeting with accuracy equivalent to that of surfaces machined to within .0001 inch, such as may be necessary in mold parts for die casting. This may be accomplished by bolting, clamping or otherwise detachably securing a plurality of mold parts in facing engagement, and subsequently drying and sintering the secured assembly. Further, the complementary pieces may be carburized in their secured relation to minimize warpage.

In particular, threaded bolts may be embedded in and project from one frozen mold part, and a complementary frozen mold part may be formed with openings for spacedly receiving the projecting bolt portions. When the mold parts are arranged in their complementary facing engagement, the bolt receiving openings may be filled with additional fluidized molding mixture which freezes firm about the bolts and holds the mold parts together throughout the drying and sintering steps. The bolts may subsequently be removed and replaced, as desired, by simple screwing operations.

Figure 6:
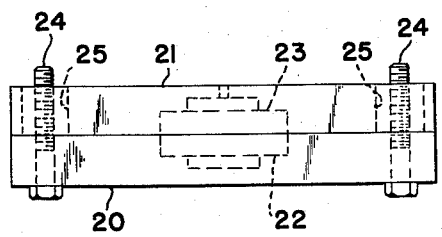
Figure 6 is a side elevational view showing the mold parts of Figure 5 at a slightly later stage in the practice of the instant method.
Figure 7:
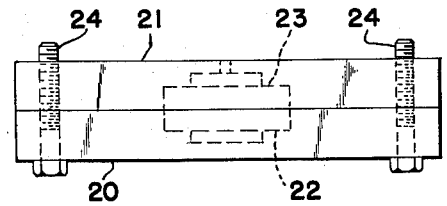
Figure 7 is a side elevational view showing the parts of Figure 7 in still a later stage of the instant method.

This procedure is illustrated in Figures 5, 6 and 7, wherein are illustrated a pair of complementary mold parts 20 and 21 which have been frozen as described hereinbefore. The mold parts 20 and 21 have complementary cavities 22 and 23, respectively, formed in their facing or mating surfaces. One of the mold parts is illustrated as having been frozen with a plurality of screws, or other suitable fasteners 24 embedded in the respective mold part. The fasteners or bolts 24 are illustrated as projecting outward through the mating surface of the mold part 20. Formed in the mold part 21, arranged therein for conforming spaced reception of the respective projecting fasteners 24, are a plurality of holes or bores 25, which may open from the inner or mating surface of the mold part 21 through the outer side thereof.

The complementary mold parts 20 and 21 are illustrated in Figure 6 with their mating surfaces in facing engagement and the fasteners 24 projecting from the mold part 20 spacedly through respective bores 25 of the mold part 21. Additional fluent mold material of the type described hereinbefore may be introduced into the holes 25 surrounding the fasteners 24, and frozen in place. In this condition, the mold parts are firmly secured together with their mating surfaces in intimate facing engagement, being retained in such condition by the fasteners 24 respectively extending in threaded engagement through the mold parts. The above described drying, sintering, and carburizing may be performed with the mold parts in the thus bolted together condition to minimmize and substantially eliminate relative warpage and distortion of the mold parts. Of course, the mold parts may be separated by merely removing the bolts 24, and replaced in their intimate mating engagement by replacement of the bolts.

From the foregoing, it is seen that the present invention provides an improved method of molding, composition for use therein, and article produced thereby, which fully accomplish their intended objects, and are well adapted to meet practical conditions of use.

Although the present invention has been described in some detail by way of illustration and example for purposes of clarity of understanding, it is understood that certain changes and modifications may be made within the spirit of the invention and scope of the appended claims.

What is claimed is:

1. In the method of making a permanent mold, the steps which comprise: admixing a powdered molding material which includes relatively small particles capable of sintering at a relatively low temperature and relatively large particles refractory at said relatively low temperature with a liquid to provide a fluidized mixture, introducing separate quantities of said liquid and molding material mixture into respective cavities specifically configured to form said quantities in the shapes of complementary mold parts, freezing said quantities of liquid and molding material mixture to set the same in said shapes, removing said frozen quantities from said cavities, fitting said frozen quantities together in their complementary relation evaporating the frozen liquid from said frozen quantities to dry the molding material in said shapes, heating said dried molding material sufficiently to sinter said relatively small particles and thereby form rigid bodies in said shapes, and separating said rigid bodies from each other.

2. The method of making a permanent mold according to claim 1, further characterized by applying a parting agent to the interior surfaces of said cavities before the introduction of said separarte quantities, said parting agent serving to facilitate the separation of said bodies after heating.

References Cited in the file of this patent

UNITED STATES PATENTS

| | | |
|---|---|---|
| 2,213,495 | Hagar | Sept. 3, 1940 |
| 2,420,692 | Wainer | May 20, 1947 |
| 2,525,324 | Twells | Oct. 10, 1950 |
| 2,735,155 | Glaser | Feb. 21, 1956 |
| 2,765,512 | Nesbit | Oct. 9, 1956 |

OTHER REFERENCES

"Refractory Materials, Their Manufacture and Uses," by A. B. Searle, 3rd Edition, 1950, published by Charles Griffin and Company, London, pages 520, 521 and 539. (Copy available in Division 56.)